No. 641,275. Patented Jan. 16, 1900.
J. R. CRAVATH.
MOTORMAN'S RECORDER.
(Application filed Apr. 1, 1899.)
(No Model.)
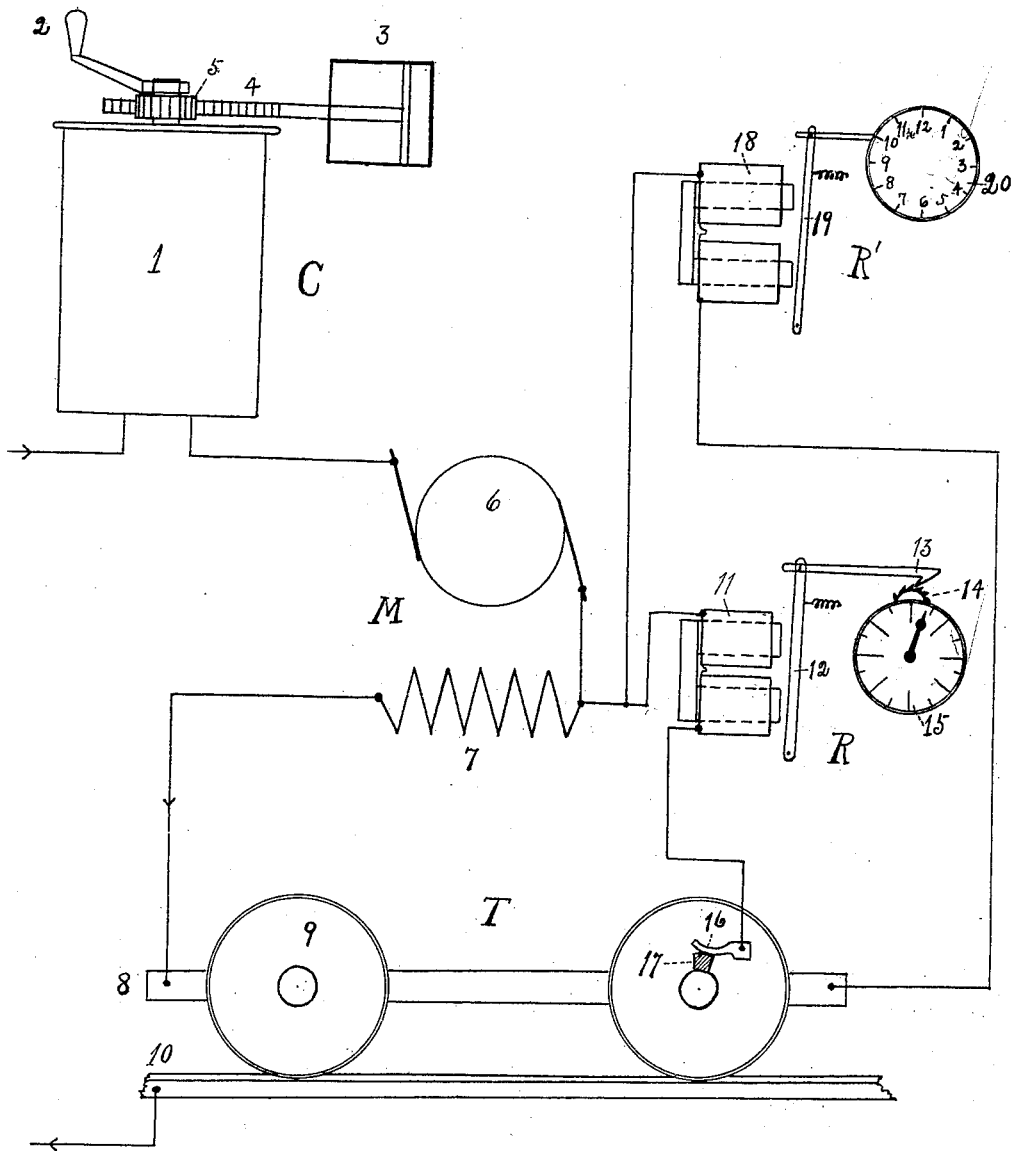
WITNESSES.
Clarence W. Coleman
Hattie Coleman
INVENTOR.
James R. Cravath

UNITED STATES PATENT OFFICE.

JAMES R. CRAVATH, OF CHICAGO, ILLINOIS.

MOTORMAN'S RECORDER.

SPECIFICATION forming part of Letters Patent No. 641,275, dated January 16, 1900.

Application filed April 1, 1899. Serial No. 711,451. (No model.)

*To all whom it may concern:*

Be it known that I, JAMES R. CRAVATH, a citizen of the United States, residing at Chicago, in the county of Cook, in the State of Illinois, have invented a new and useful Motorman's Recorder, of which the following is a specification.

My invention relates to a motorman's recorder, my object being to provide a cheap practical means of keeping account of the comparative amount of electrical energy used by various men operating electric motors under the same conditions—as, for example, on the various cars of an electrical railway system. It is well known that it is desirable to keep such records, because by so doing the management of an electric railway can make the motorman more economical in the consumption of electrical energy required to propel each car. Instruments to record the actual amount of electrical energy taken by each man have been sometimes used; but it is desirable, if possible, that something cheaper, less delicate, and less liable to injury in service than an electrical measuring instrument be used.

It is now generally understood that electrical energy is wasted by motormen in operating electrical cars mainly in two ways: first, by turning the controller too rapidly in starting, thus giving rise to a number of losses which it is not necessary to discuss here, and, second, wasting an unnecessary amount of energy in the brake-shoes by not allowing the car to drift with current off as much as possible and by keeping brakes partly set, thereby keeping the current turned on more of the time than is necessary. Now if the maximum rate of turning on current in starting be in some way automatically controlled and limited by electrical or mechanical means to a predetermined rate the waste in starting too quickly is done away with. Devices to accomplish this are now in use. However, such devices do not prevent a motorman from wasting energy by keeping resistance in the circuit too long in starting or from keeping the current turned on the motors longer than necessary, and thereby of necessity wasting an undue amount of energy in the brake-shoes.

My invention consists in combining any such appliance whereby the maximum rate of turning on the controller is kept within a predetermined limit with a recording device or devices whereby the number of revolutions the motor or motors run with the current on or the time the motors run with the current on is automatically recorded. With this arrangement since the maximum rate of turning on the controller is adjusted at the proper amount the indications of an instrument recording either the time or the distance traveled by the motors with current turned on furnish reliable data for comparing efficiencies of different motormen operating motors under the same conditions, for that motorman who keeps the current in his motors the least is the most economical man as long as the maximum rate of turning on the controller is the same for all men. Such recording instruments can be made very simple and cheap and are not injured by the jolting of the car, as delicate measuring instruments are liable to be.

In the drawing I show in diagram one of the preferred arrangements of my invention as applied to an electric railway-motor and controller. The electric current, as shown by the arrows, enters through the car-controller C, passes thence to the motor M and to the car-truck T, and from there to the rails and ground. In shunt with the motor-fields are the two recording devices R and R'. The controller C consists of the usual box 1, containing the controlling-switches operated by the handle or crank 2. In order to limit the rate at which current may be turned into the motor, the motion of the handle 2 is retarded by the dash-pot 3, operated by the rack 4 and pinion 5 on the shaft of the controller. However, I do not wish to limit myself to this particular method of limiting the rate of advancement of the controller-handle, nor do I claim here any invention as to the method of limiting the rate of turning on current. Several methods of doing this are known to the art, any of which may be employed in connection with my invention. From the controller the current enters the armature 6 of the motor M, and from thence the greater portion flows through the motor-fields 7 to the car-truck frame 8, through the car-wheel 9, and to the rail 10.

In shunt-circuit with the field-coils 7 and taking but a small amount of current are the recorders R and R'. R is for the purpose of showing the distance traveled with the current turned on the motor, and the device R' is for showing the time elapsed with the current on the motor. Either R or R' can be used alone or in combination, as shown. In practice either one of these devices R or R' will be usually sufficient to furnish an accurate comparative record of men operating motors under the same conditions, and either R or R' can be omitted without interfering with the operation of the remaining device.

The recording device R consists of the electromagnet 11, which when organized will attract the iron armature 12, which is normally held away by a spring, said armature being connected to the pawl 13, operating the ratchet-wheel 14, which in turn operates the cyclometer or revolution-counter 15. When the car is in motion and current is on the motor, the circuit through electromagnet 11 is completed once each revolution of the car-wheel by a contact-finger 16, engaging with the contact-lug 17 on the car-axle, so that the current may flow to the truck-frame and rails. The cyclometer 15 is therefore operated once each car-wheel revolution, thus measuring the distance traveled with current in the motor.

In the recording device R' the electromagnet 18 is connected permanently in shunt with the motor-field coil 7. Whenever current is turned into the motor, the electromagnet 18 is therefore energized, the armature 19 is attracted, and the stop watch or clock 20 is set in motion. When current is turned off, the armature 19 is drawn back by a spring and the watch is stopped. The watch therefore runs only when current is on the motor.

I do not wish to confine myself to the use of the particular forms and connections of R and R' described, but wish to be understood as comprehending, broadly, the use of any device whereby the time or distance the motors run with current on can be recorded. Thus, for example, the recording devices might be made to record during the periods current is off the motor instead of the periods it is on. The stop-watch or revolution-counter might also be operated mechanically by the turning on and off of the controller. My invention is also intended for use with several motors and controllers used in combination instead of on one motor and controller, as shown.

Having described my invention, what I claim as new, and upon which I desire to secure Letters Patent, is—

1. The combination of an electric motor, a controller for said motor, means whereby the maximum possible rate of turning on said controller is kept within a predetermined limit, and a device or devices operated by the turning off or on of said controller, said device or devices adapted to record the number of revolutions said motor operates with current on.

2. The combination of an electric motor, a controller for said motor, means whereby the motorman is prevented by an electrical or mechanical device from turning on the controller faster than a predetermined rate for which the device is set, and device or devices adapted to record the duration of time said motor operates with current on.

3. The combination of an electric motor, a controller for said motor, means whereby the maximum possible rate of turning on current is kept within a predetermined limit and a revolution-counter operated by the turning on of the controller to record the number of revolutions made by the motor with current turned on.

4. The combination of an electric motor, a controller for said motor, means whereby the maximum possible rate of turning on said controller is kept within a predetermined limit and a stop watch or clock operated by the turning on of said controller to record the duration of time the current is turned on by said controller.

JAMES R. CRAVATH.

Witnesses:
CHARLES S. WILLISTON,
GEORGE E. HALEY.